W. H. PAGE.
Feed-Ration for Army and other Uses.
No. 5,981. Reissued July 21, 1874.
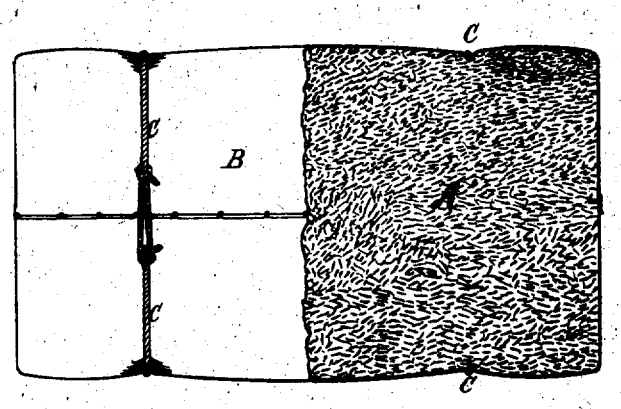
WITNESSES.
A. J. De Lacy.
A. B. Bishop.
INVENTOR.
W. H. Page
by M. M. Brumpton
his Attorney

UNITED STATES PATENT OFFICE.

WILLIAM H. PAGE, OF GREENPORT, NEW YORK, ASSIGNOR TO JACOB C. KAMP AND JERRY BROWN, OF NEW YORK CITY.

IMPROVEMENT IN FEED-RATIONS FOR ARMY AND OTHER USES.

Specification forming part of Letters Patent No. 38,798, dated June 2, 1863; reissue No. 5,981, dated July 21, 1874; application filed July 13, 1874.

*To all whom it may concern:*

Be it known that I, WILLIAM H. PAGE, formerly of the city, county, and State of New York, but now of Greenport, in the county of Suffolk and State of New York, am the original and first inventor of a new and useful mode of preparing and putting up forage and feed for horses and cattle, especially for army use; and I hereby declare that the following is a full, clear, and exact description thereof, reference being had to the accompanying drawing, which forms part of this specification.

My invention is particularly useful for providing army horses and cattle with rations, and in such cases it is desirable to mix with cut hay some grain or ground feed, and I shall thus describe it.

The accompanying drawing illustrates my said invention.

A designates the material, compressed into bale form; B, the covering, and C the baling cords or ropes. I take any desired quantity of the grain which is to constitute part of the ration, such as corn, oats, or other cereal, either in the kernel or ground, as preferred. I then, by any of the ordinary means, cut any proposed amount of hay or other forage into pieces, which I prefer should be about an inch in length. I next put the ground grain and cut hay together into a mass of any convenient bulk, and place the whole in any press of good construction, such, for instance, as is used for pressing tobacco or for analogous purposes, and compress the same until it is made as compact and small in bulk as it conveniently can be. To preserve the shape and size of the ration while it is being pressed, I prefer to put it into a mold of the dimensions which it is to have when finished, though the mold may be deeper than the thickness of the prepared ration, so that the sides may confine the material properly while the compression is taking place. This mold may be of wood or any other suitable material, and may be made like a box, without top or bottom. It is to be set into the press and the loose uncompressed material put into it and pressed to the form of the mold, the thickness of the mass being of course determined by the degree of compression desired. After the mold is in the press, and before the material is placed into it, I lay a piece of bagging, which will inclose the finished ration, inside the mold, letting its ends hang over the outside. I then put in the mass A to be pressed, and when it is sufficiently compacted I draw together the ends of the bagging B, cut off any surplus there may be, and bind the bale with baling ropes or cords C.

I do not think that it will be found profitable to compress the material into a less bulk than will constitute one day's ration for an army horse, which, in this country, is ordinarily about twenty-six pounds—say fourteen pounds of cut hay and twelve pounds of grain. But a larger quantity than this can be advantageously treated by my mode, and after it is pressed it may be cut up into any required dimensions.

By this improvement I am enabled to put into a space of, say, two hundred pounds an amount of forage and feed which, in its ordinary form, would occupy a space of sixteen hundred pounds. The very important savings, in many ways, which I thus effect will be obvious to all familiar with the subject.

Having thus fully described my invention, what I claim as new, and desire to secure by Letters Patent, is—

1. An army ration consisting of the desired quantity of cut hay and grain or ground feed, compressed into bale form, and bound with cords or ropes, substantially as herein specified.

2. The new article of manufacture and commerce, of a bale of cut hay closely compressed, and provided with a suitable covering, and held in its compressed state by cords or ropes, substantially as herein specified.

WM. H. PAGE.

Witnesses:
T. L. IRELAND,
JOHN O. IRELAND.